(12) United States Patent
Hieda

(10) Patent No.: US 9,514,176 B2
(45) Date of Patent: Dec. 6, 2016

(54) DATABASE UPDATE NOTIFICATION METHOD

(75) Inventor: Satoshi Hieda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 518 days.

(21) Appl. No.: 13/982,478

(22) PCT Filed: Feb. 7, 2012

(86) PCT No.: PCT/JP2012/000793
§ 371 (c)(1),
(2), (4) Date: Jul. 29, 2013

(87) PCT Pub. No.: WO2012/108175
PCT Pub. Date: Aug. 16, 2012

(65) Prior Publication Data
US 2013/0311425 A1    Nov. 21, 2013

(30) Foreign Application Priority Data

Feb. 10, 2011    (JP) ................................. 2011-026735

(51) Int. Cl.
*G06F 17/30* (2006.01)
(52) U.S. Cl.
CPC .............................. *G06F 17/30345* (2013.01)
(58) Field of Classification Search
CPC ................ G06F 3/067; G06F 17/30905; G06F 17/30575; G06F 17/30345
See application file for complete search history.

(56) References Cited

U.S. PATENT DOCUMENTS

| 6,266,678 | B1  | 7/2001 | McDevitt et al. |
| 6,505,199 | B1  | 1/2003 | Nakano et al. |
| 6,728,710 | B2  | 4/2004 | Nakano et al. |
| 6,938,043 | B2  | 8/2005 | Nakano et al. |
| 8,782,203 | B2* | 7/2014 | Appleton ............ H04L 41/0609 709/224 |

(Continued)

FOREIGN PATENT DOCUMENTS

| CN | 1542637 A | 11/2004 |
| CN | 1783792 A | 6/2006 |

(Continued)

OTHER PUBLICATIONS

Chinese Office Action dated May 5, 2015 with an English translation thereof.
International Search Report (ISR) (PCT Form PCT/ISA/210), in PCT/JP2012/000793, dated Mar. 13, 2012.
Japanese Office Action dated Mar. 4, 2014.

*Primary Examiner* — Robert Beausoliel, Jr.
*Assistant Examiner* — Susan F Rayyan
(74) *Attorney, Agent, or Firm* — McGinn IP Law Group, PLLC

(57) ABSTRACT

An information processing device includes an access requesting unit, an access type determination unit, a notified party information acquisition unit, and a notifying unit. The information processing device is able to access a notified party information storage unit that stores information of a notified party in association with location information of particular data stored in a database server. The access type determination unit determines whether or not an access request issued by the access requesting unit is an access request relating to updating. If the issued access request is an access request relating to updating, the notified party information acquisition unit acquires information of a notified party corresponding to location information of data to be updated by the access request, from the notified party information storage unit. The notifying unit gives notice to a notified party specified in the acquired information of the notified party.

18 Claims, 11 Drawing Sheets

(56) References Cited

U.S. PATENT DOCUMENTS

| | | | | |
|---|---|---|---|---|
| 8,856,136 B2* | 10/2014 | Yamakawa | ......... | G06F 21/6245 707/741 |
| 8,983,907 B2* | 3/2015 | Kwiatkowski | ...... | H04L 67/1095 707/624 |
| 2004/0172423 A1* | 9/2004 | Kaasten | ............ | G06F 17/30176 |
| 2006/0095397 A1* | 5/2006 | Torres | ................. | G06F 17/3089 |

FOREIGN PATENT DOCUMENTS

| | | |
|---|---|---|
| JP | 09-282210 | 10/1997 |
| JP | 11-194983 | 7/1999 |
| JP | 2000-172540 A | 6/2000 |
| JP | 2002-533838 A | 10/2002 |
| JP | 2008-027065 A | 2/2008 |
| WO | WO 2009/044460 A1 | 4/2009 |

* cited by examiner

DATABASE UPDATE NOTIFICATION METHOD

TECHNICAL FIELD

The present invention relates to a database update notification method in an information processing device which accesses a database, and in particular, to a database update notification method for giving notice to a particular notified party when particular data in a database has been changed.

BACKGROUND ART

In general, a database update notification method of this type is realized by incorporating a system of detecting a change in particular data in the server side of the database.

For example, Patent Document 1 discloses art in which a server with a database has rules for monitoring the database, rules for notifying detection results, and a file containing database access history, and with use of a process other than the database, the server periodically checks whether there is any change in the monitored data by referring to the monitoring rules and the access history file, and when detecting any change, the server gives notice to a particular user in accordance with the notification rules.

Patent Document 2 discloses a method of detecting, by a server with a database, whether or not there is any change in a data file by using an appropriate method, that is, a method of periodically checking the file size and the access time, for example, and if there is any change, notifying a particular client of the updated content or the like.

Further, paragraph 0004 of Patent Document 1 discloses a method in which when an update (INSERT, UPDATE, or DELETE) command is issued to a table which is monitored, the database performs an associated stored procedure to thereby detect a change in data.

Patent Document 1: JP 9-282210 A
Patent Document 2: JP 2002-533838 A

SUMMARY

It is a very natural concept to detect whether or not a change has been made to particular data in a database, using a function incorporated in the server side of the database. As such, various methods have been proposed as described above. However, if a function of monitoring whether or not a database has been changed and giving notice is implemented on the server side, the load on the CPU and I/O of the server becomes higher, so that the throughput of the database is lowered.

An object of the present invention is to provide a database update notification method which solves the above-described problem, that is, a problem that a configuration of giving notice to a particular notified party, when particular data in a database has been changed, lowers the throughput of the database.

A database update notification method, which is an aspect of the present invention, is a database update notification method to be performed by an information processing device including an access requesting means for issuing an access request to a database server, an access type determination means, a notified party information acquisition means, and a notifying means. The method includes
by the access type determination means, determining whether or not an access request issued by the access requesting means is an access request relating to updating;
if the issued access request is an access request relating to updating, by the notified party information acquisition means, acquiring information of a notified party corresponding to location information of data to be updated by the access request, from notified party information storage means for storing information of a notified party to which notice is given when there is any change in particular data in association with location information of the particular data stored in the database server; and
by the notifying means, giving notice to a notified party specified in the acquired information of the notified party.

Further, an information processing device, according to another aspect of the present invention, is adapted to include
an access requesting means for issuing an access request to a database server;
an access type determination means for determining whether or not the issued access request is an access request relating to updating;
a notified party information acquisition means for, if the issued access request is an access request relating to updating, acquiring information of a notified party corresponding to location information of data to be updated by the access request, from notified party information storage means for storing information of a notified party to which notice is given when there is any change in particular data in association with location information of the particular data stored in the database server; and
a notifying means for giving notice to a notified party specified in the acquired information of the notified party.

With the above-described configuration, the present invention is able to detect a change in particular data in a database and give notice, without lowering the throughput of the database.

EXEMPLARY EMBODIMENTS

Next, exemplary embodiments of the present invention will be described in detail with reference to the drawings.

First Exemplary Embodiment

Figure 1:
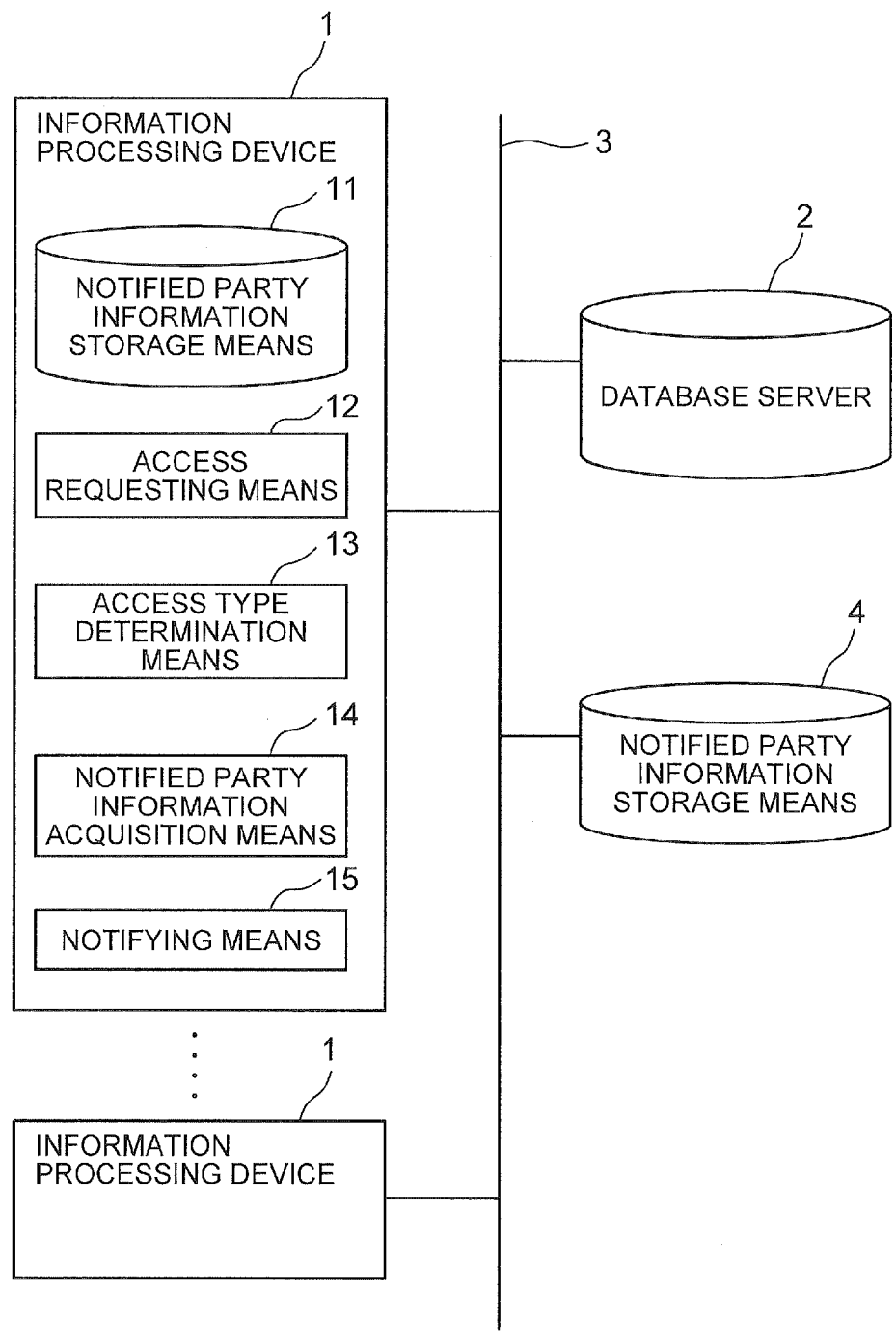
FIG. 1 is a block diagram showing a first exemplary embodiment of the present invention.

Referring to FIG. 1, a first exemplary embodiment of the present invention includes one or more information processing devices 1, a database server 2, and a network 3 connecting them communicably with each other.

The database server 2 is configured of a KVS (Key Value Store) server, an SQL server, or the like. The database server 2 stores data shared by one or more information processing devices 1.

The information processing device 1 is a client which refers to and updates data stored in the database server 2. The information processing device 1 includes a notified party information storage means 11, an access requesting means 12, an access type determination means 13, a notified party information acquisition means 14, and a notifying means 15.

The notified party information storage means 11 has a function of storing information of a notified party to which notice is given, in association with location information of particular data stored in the database server 2, when there is a change in the particular data.

In the case of giving notice to an application program, not shown, running on the self information processing device 1, the information of a notified party is information specifying the application program (e.g., a process ID). In the case of giving notice to an application program, not shown, running on another information processing device 1, the information of a notified party is information specifying the other information processing device 1 (e.g., an IP address of the information processing device) and information specifying the application program on the information processing device (e.g., a process ID). Further, the information of a notified party may also include information to be notified to the notified party. For example, the above-mentioned information of a notified party may include information for uniquely identifying callback information (e.g., a function pointer address of a callback function) as information to be notified to the notified party.

The location information is information showing the location of data. For example, if the database server 2 is a KVS server, a key in the KVS corresponds to the location information.

The access requesting means 12 has a function of issuing an access request to the database server 2.

The access type determination means 13 has a function of determining whether or not an access request issued by the access requesting means 12 is an access request relating to updating. For example, the access type determination means 13 determines the access type by analyzing the access request, and if the access type is one involving updating of data (e.g., SET command), the access type determination means 13 determines that it is an access request relating to updating.

The notified party information acquisition means 14 has a function of checking, if an access request is determined to be an access request relating to updating by the access type determination means 13, whether or not information of a notified party associated with the location information of the data to be updated by the access request is stored in the notified party information storage means 11, and if stored, acquiring the information of the notified party from the notified party information storage means 11. If the access request is a request to access a KVS server, the notified party information acquisition means 14 uses the key included in the access request to check whether or not information of the notified party associated with the key is stored in the notified party information storage means 11, and if stored, acquires the information.

The notifying means 15 has a function of giving notice that there is a change in data, to the notified party specified by the information of the notified party acquired by the notified party information acquisition means 14. If the information of the notified party includes information to be notified to the notified party, the notifying means 15 gives notice with information to be notified to the notified party.

Figure 2:
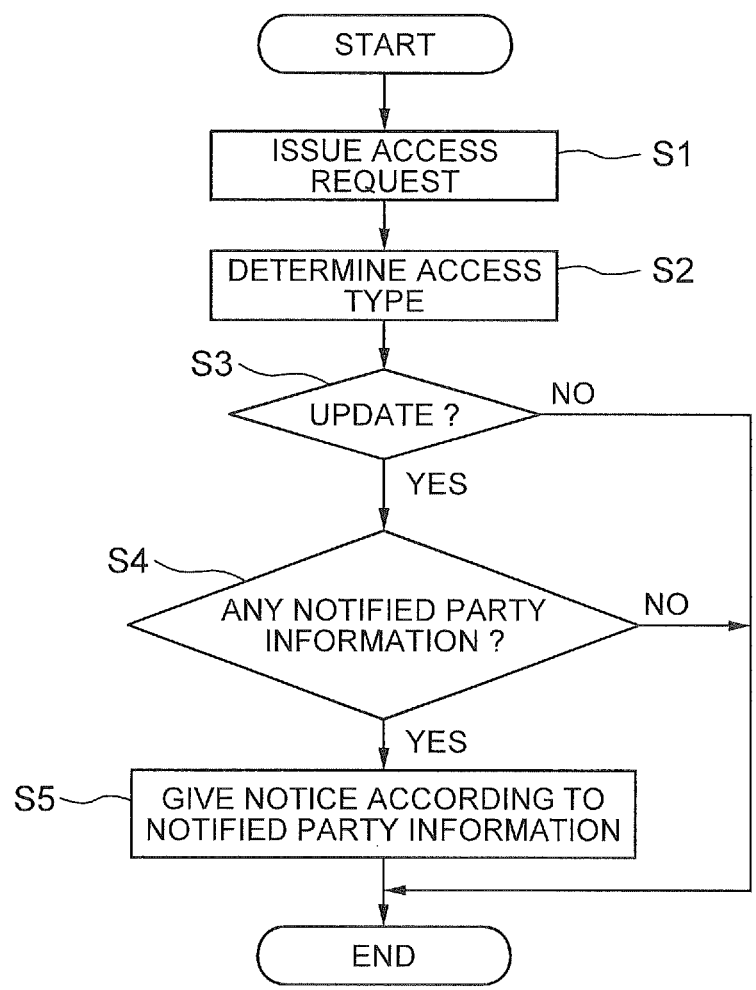
FIG. 2 is a flowchart showing an operation of the first exemplary embodiment of the present invention.

Next, operation of the present embodiment will be described with reference to the flowchart of FIG. 2.

Here, it is assumed that notified party information T1 is stored in the notified party information storage means 11 of the information processing device 1, in association with location information L1 of data.

When the access requesting means 12 of the information processing device 1 issues an access request to the database server 2 (step S1), the access request is transmitted to the database server 2 over the network 3 and is received by the access type determination means 13.

The access type determination means 13 determines the type of the received access request (step S2). If it is an access request for updating, the notified party information acquisition means 14 checks whether or not information of the notified party corresponding to the location information of the data to be accessed included in the access request is stored in the notified party information storage means 11 (step S3, S4). Here, if the location information included in the access request is L1, as the notified party information T1 is present, the notified party information acquisition means 14 acquires it.

The notifying means 15 receives the notified party information T1 from the notified party information acquisition means 14, and gives notice to the notified party specified in the notified party information T1 (step S5). In this step, if there is any information which should be notified to the notified party, notice is given together with such information. Upon receipt of the notice, the notified party is able to recognize that data specified by the location information L1 of the database server 2 is changed. Further, if a function pointer address of a callback function is attached to the notice, the notified party calls the callback function. Thereby, the notified party is able to perform predetermined processing in synchronization with the change of the particular data.

As described above, according to the present embodiment, the database server 2 is not involved at all in the processing of detecting that a change has been made to particular data in the database server 2 and giving notice. As such, it is possible to detect that a change has been made to particular data in the database and give notice, without lowering the throughput of the database.

Further, by incorporating the notified party information storage means 11, the access requesting means 12, the access type determination means 13, the notified party information acquisition means 14, and the notifying means 15 in every information processing device 1 which may access the particular data in the database server 2, it is possible to detect that a change has been made to particular data in the database server 2 and give notice, without fail.

In the above description, the notified party information storage means 11 is provided to each information processing device 1, individually. However, as shown in FIG. 1, a configuration in which one or more notified party information storage means 4 are connected with the network 3 and the notified party information storage means 4 are shared by multiple information processing devices 1 may also be acceptable. Further, while in the above description the access type determination means 13 performs processing out of synchronization with an access request issued by the access requesting means 13, it is possible to start processing after confirming normal completion of the access request.

Second Exemplary Embodiment

Figure 3:
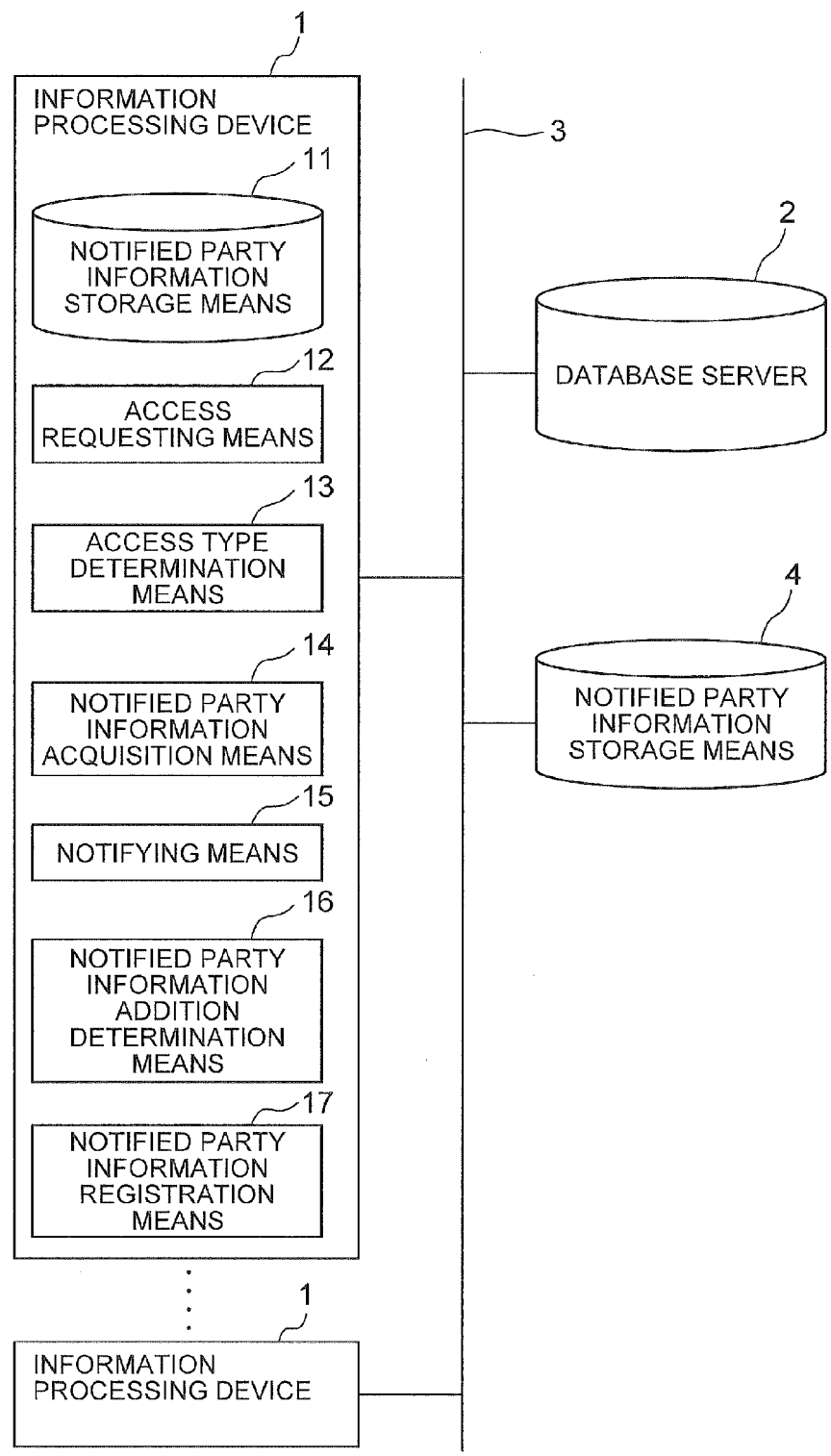
FIG. 3 is a block diagram showing a second exemplary embodiment of the present invention.

Referring to FIG. 3, a second exemplary embodiment of the present invention is different from the first exemplary embodiment shown in FIG. 1 in that the information processing device 1 further includes a notified party information addition determination means 16 and a notified party information registration means 17.

The notified party information addition determination means 16 has a function of determining whether or not notified party information is added to an access request issued by the access requesting means 12.

The notified party information registration means 17 has a function of storing, in the notified party information storage means 11, notified party information added to an access request, in association with location information of data to be accessed included in the access request.

Next, operation of the present embodiment will be described. In the present embodiment, a first operation and a second operation are performed. The first operation is to register location information of data and notified party information in the notified party information storage means 11 in order that notice is given to a particular notified party when a change has been made to particular data in the database server 2, and the second operation is to monitor an access request to the database server 2 based on the information stored in the notified party information storage means 11 and give notice to a particular notified party when a change has been made to particular data. As the second operation is the same as the operation of the first exemplary embodiment, description will be given below mainly on the first operation.

In an attempt to give notice to a particular notified party when a change has been made to data located at a given location in the database server 2, the information processing device 1 issues a request to access the data, with an addition of notified party information. The type of access request may be a reference request or an update request. In this example, it is assumed that notified party information T2 is added to the access request. It is also assumed that location information specifying data to be accessed, included in the access request, is L2.

When an access request, to which the notified party information T2 is added, is issued from the access requesting means 12, the access request is transmitted to the database server 2 over the network 3, and is received by the access type determination means 13 and the notified party information addition determination means 16.

The operation of the access type determination means 13 which received the access request, and the following operations of the notified party information acquisition means 14 and the notifying means 15, that is, the second operation, are the same as the operations in the first exemplary embodiment.

On the other hand, the notified party information addition determination means 16, which received the access request, determines whether or not notified party information is added to the access request. In this case, the notified party information T2 is added. As such, the notified party information registration means 17 stores the notified party information T2, added to the access request, in the notified party information storage means 11 in association with the location information L2 of the data to be accessed included in the access request.

As described above, according to the present invention, an attempt to give notice to a particular notified party, when a change has been made to data located at a given location in the database server 2, can be made by accessing the data using the access request to which the notified party information is added.

Third Exemplary Embodiment

Figure 4:
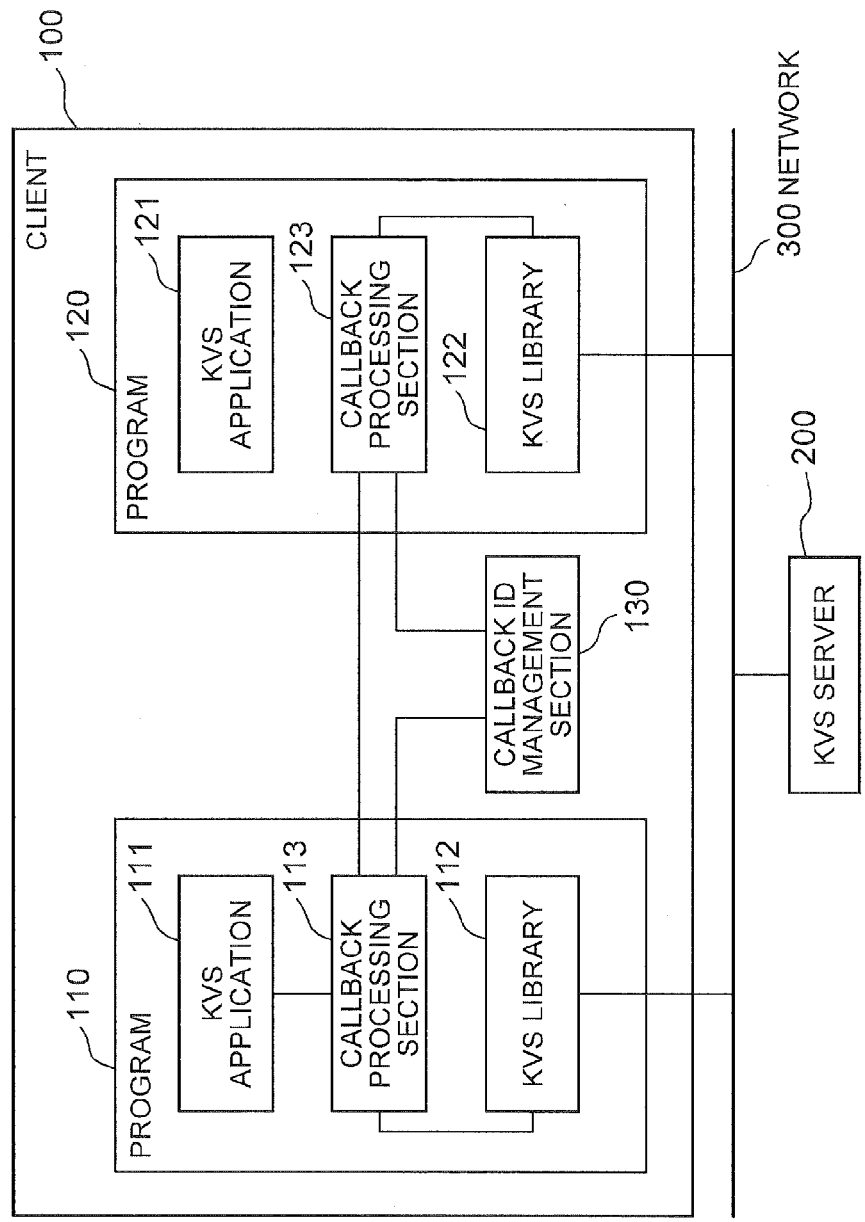
FIG. 4 is a block diagram showing a third exemplary embodiment of the present invention.

Referring to FIG. 4, the present embodiment includes a client 100, a KVS server 200, and a network 300.

The KVS server 200 is a server (information processing device) which accepts an access request in Key-Value format from the client 100, and processes it. The KVS server 200 does not have a function of executing processing designated by an application at the time of data updating, like a stored procedure of a SQL server. As such, the KVS server 200 is not able to perform data update notification.

The client 100 is a node (information processing device) including a program 110 and a program 120 for accessing the KVS server 200, and a callback ID management section 130.

The callback ID management section 130 stores a key and a callback ID in association with each other. Here, a callback ID is an identifier which uniquely identifies an application and callback information in the client 100, which corresponds to a character string generated by linking a PID (Process ID) of Linux and a function pointer address of a callback function, for example. In the following description, a callback ID is assumed to be a character string generated by linking a PID and a function pointer address.

The program 110 includes a KVS application 111, a KVS library 112, and a callback processing section 113.

The KVS application 111 is the subject that performs an access to the KVS server 200, and issues an access request to the KVS server 200. Here, an access request includes an access type such as "SET" or "GET", and data location information of the access destination, data buffer, and callback information. Among them, data location information is information indicating the location of the data to be accessed, which corresponds to a key in the KVS. In the following description, a key is assumed to be data location information. Data buffer shows data associated with location information, which corresponds to a value in the KVS. Further, callback information is information of callback which is called back when data, specified by data location information in an access request, is updated by another program. This corresponds to a callback function, for example. In the following description, a function pointer address of a callback function is assumed to be callback information. It should be noted that if it is unnecessary to make a callback even when data is updated by another program, there is no need to designate callback information.

The KVS library 112 manages an interface between the KVS server 200 and the KVS application 111, and transmits an access request to the KVS server 200, in a form compatible with the interface of the KVS server 200. Further, when a processing result is returned from the KVS server 200, the KVS library 112 returns it to the upper level section.

Figure 5:
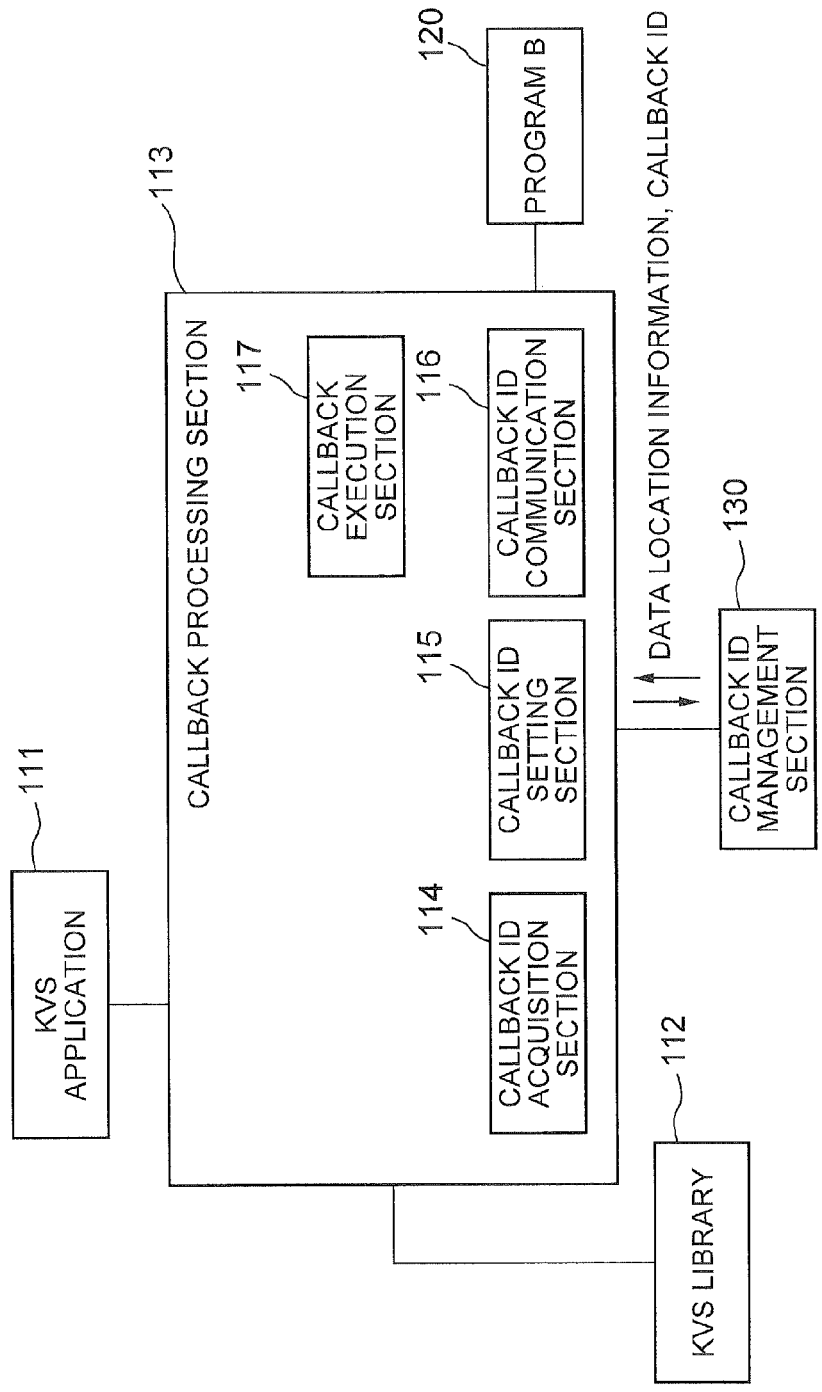
FIG. 5 is a block diagram showing a callback processing section of the third exemplary embodiment of the present invention.

FIG. 5 shows the details of the callback processing section 113 and relations with other components. Referring to FIG. 5, the callback processing section 113 includes a callback ID acquisition section 114, a callback ID setting section 115, a callback ID communication section 116, and a callback execution section 117.

The callback ID acquisition section 114 determines the access type included in an access request notified from the KVS application 111. If the access type is "update-related" for performing an update (e.g., "SET" command), the callback ID acquisition section 114 makes an inquiry to the callback ID management section 130 based on the table name included in the access request, and acquires a callback ID associated with data location information. Further, the callback ID acquisition section 114 releases the association of the acquired callback ID, and deletes it from the callback ID management section 130.

The callback ID communication section 116 performs transmission and reception of a callback ID with the program 120 and other programs. Specifically, based on the callback ID acquired by the callback ID acquisition section 114, the callback ID communication section 116 notifies the callback processing section of the corresponding program, of the callback ID. This notice corresponds to data update notice. Further, when receiving a callback ID from another program, the callback ID communication section 116 notifies the callback execution section 117 of the callback ID.

The callback execution section 117 executes a corresponding callback function based on the callback ID notified from the callback ID communication section 116. Thereby, data update is notified to the KVS application 111.

If a function pointer of a callback function is added to the access request, the callback ID setting section 115 generates a character string by linking the PID of the self program and the function pointer address of the callback function, as a callback ID. Then, the callback ID setting section 115 stores the callback ID in the callback ID management section 130, in association with a key. If there is any callback ID having been registered, it is added.

The program 120 includes a KVS application 121, a KVS library 122, and a callback processing section 123, which are the same as the KVS application 111, the KVS library 112, and the callback processing section 113, respectively. As such, the description thereof is not provided herein.

[Description of Operation]

The overall operation of the present embodiment will be described in detail. First, an operation of accessing the KVS server 200 by the program 110 will be described with reference to the flowchart of FIG. 6.

Figure 6:
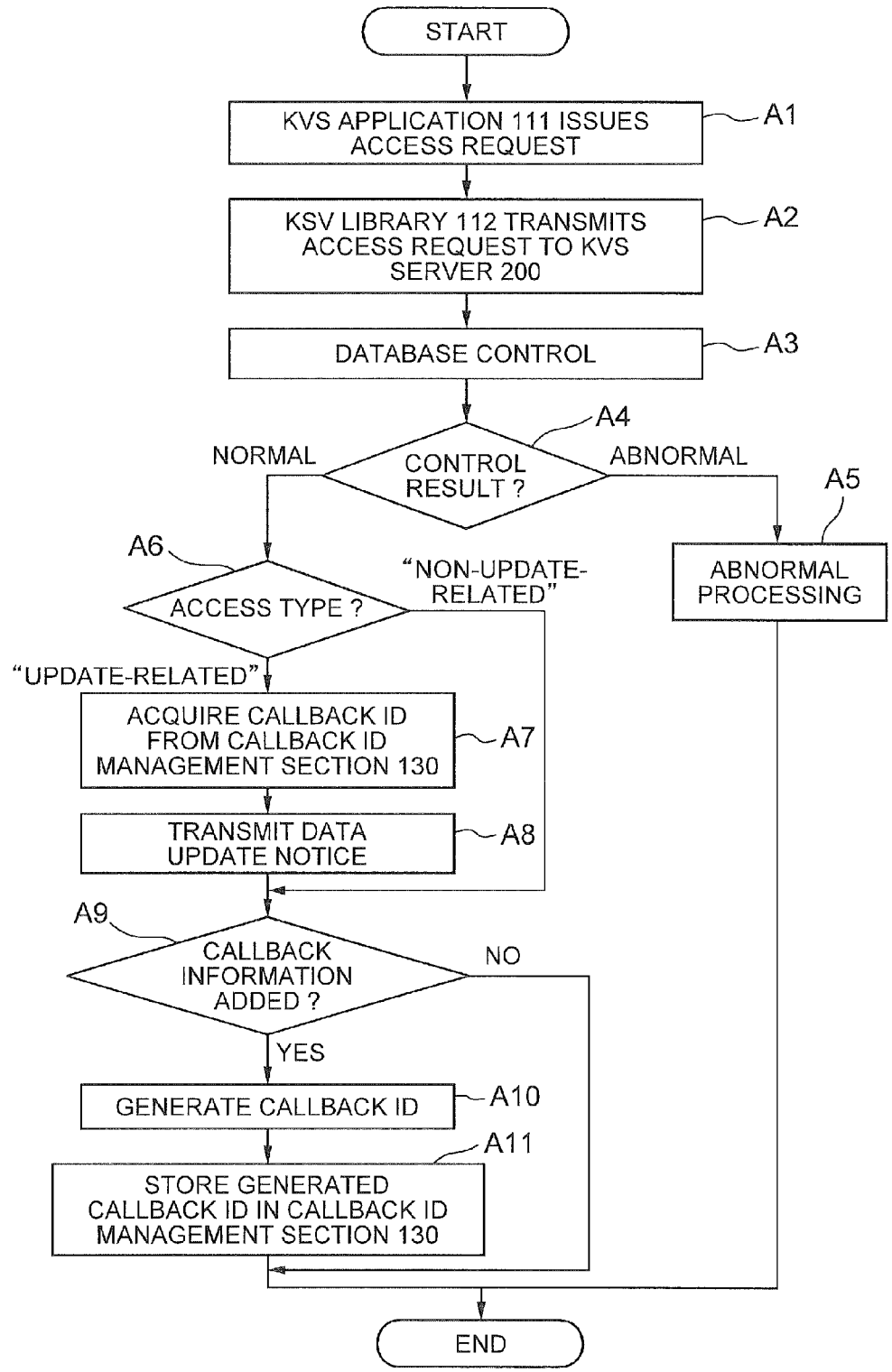
FIG. 6 is a flowchart showing an operation at the time of issuing an access request in the third exemplary embodiment of the present invention.

First, the KVS application 111 issues an access request to the KVS server 200 (step A1 in FIG. 6). The KVS library 112 transmits the access request to the KVS server 200 (step A2). The KVS server 200 performs database control based on the transmitted access request, and returns the processing result to the KVS library 112 (step A3). The KVS library 112 determines the processing result from the KVS server 200 (step A4), and if the result is abnormal, performs abnormal processing and ends the processing (step A5). If the result is normal, the callback ID acquisition section 114 determines the access type of the access request (step A6). At step A6, if the access type is an "update-related" access, the callback ID acquisition section 114 makes an inquiry to the callback ID management section 130 to acquire a callback ID associated with the key of the access request, and notifies the callback ID communication section 116 of the acquired ID (step A7). Then, the callback ID communication section 116 analyzes the PID from the notified callback ID, and transmits the callback ID to the corresponding program as a data update notice (step A8).

Next, the callback ID setting section 115 determines whether or not a pointer address of a callback function is added to the access request (step A9). At step A9, if a pointer address is added, the callback ID setting section 115 generates a character string by linking the PID of the self program and the pointer address of the callback function (step A10), stores it in the callback ID management section 130 in association with a key (step A11), and ends the processing. At step A9, if a pointer address is not added, the callback ID setting section 115 ends the processing. Further, at step A6, if the access type is a "non-update-related" access, the processing is proceeded to step A9.

An operation when the program 120 issues an access request to the KVS server 200 is the same as the operation when the program 110 issues an access request to the KVS server 200. As such, the description thereof is not provided herein.

Next, an operation when the program 110 receives a data update notice will be described with reference to the flowchart of FIG. 7.

Figure 7:
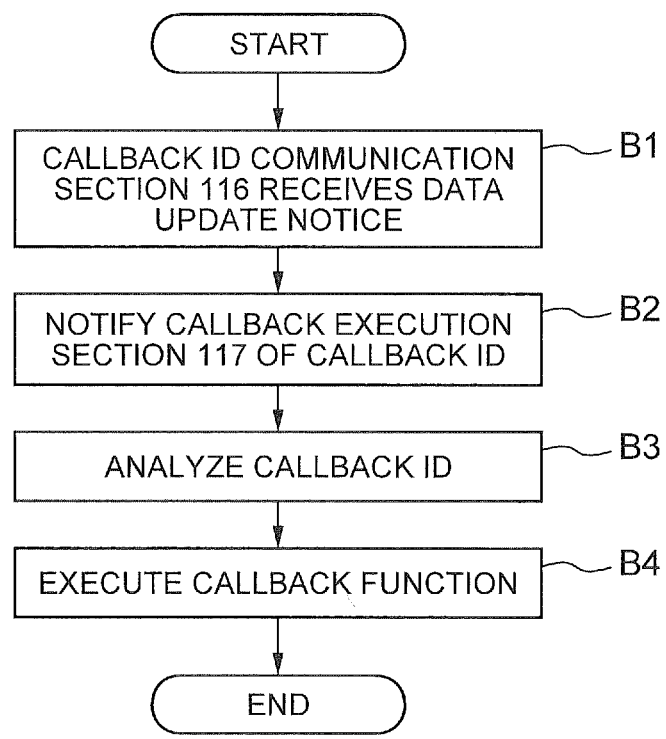
FIG. 7 is a flowchart showing an operation at the time of receiving data update notice in the third exemplary embodiment of the present invention.

The callback ID communication section 116 receives a data update notice from another program (step B1 in FIG. 7). Then, the callback ID communication section 116 notifies the callback execution section 117 of the callback ID included in the data update notice (step B2). The callback execution section 117 analyzes the callback ID, and executes the corresponding callback function (steps B3, B4).

As an operation when the program 120 receives a data update notice is the same as the operation when the program 110 receives a data update notice, the description thereof is not provided herein.

[Description of Effects]

As the present embodiment is configured to perform data update notice regardless of a database server or a database client library which are often provided in a binary form, it is possible to provide a data update notification function to a database server which does not have a data update notification function originally.

Further, as the present embodiment is configured to perform data update notice between programs in the same client without using a network, ultrahigh-speed data update notice can be performed.

Fourth Exemplary Embodiment

Figure 8:
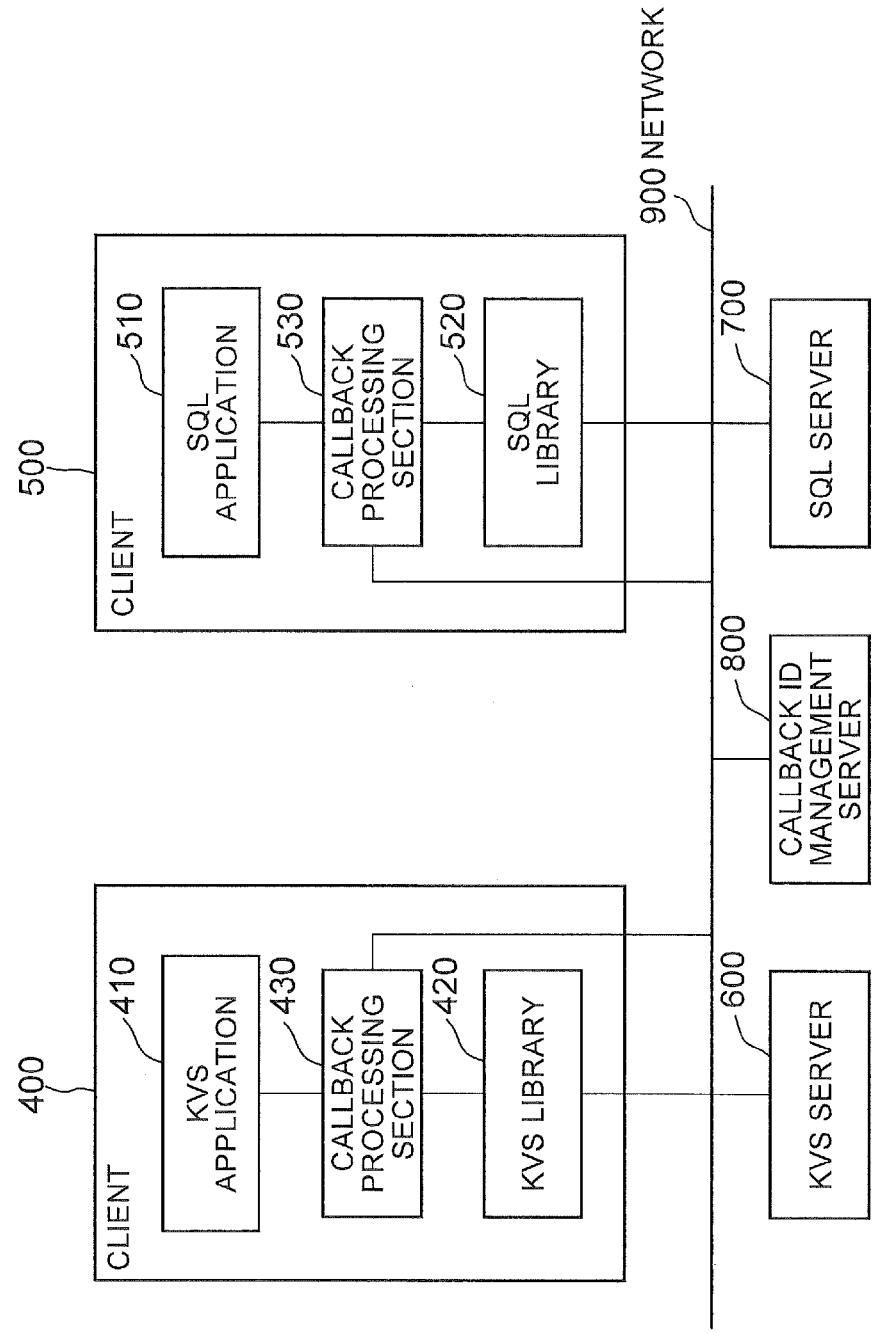
FIG. 8 is a block diagram showing a fourth exemplary embodiment of the present invention.

Referring to FIG. 8, the present embodiment includes a client 400 which executes KVS applications, a client 500 which executes SQL applications, a KVS server 600, an SQL server 700, a callback ID management server 800, and a network 900.

The callback ID management server 800 is adapted to store a character string generated by linking location information of a database server, namely an IP address of a database to be accessed for example (hereinafter description will be given on the assumption that an IP address of a database to be accessed is location information of a database to be accessed), and a callback ID, and is accessible from a plurality of nodes. Here, a callback ID is an identifier uniquely identifies callback information in the system, which corresponds to, for example, a character string generated by linking an IP (Internet Protocol) address of each node, a PID of an application, and a function pointer address of a callback function. Hereinafter, description will be given based on the assumption that a character string generated by linking an IP address of each node, a PID of an application, and a function pointer address of a callback, is a callback ID. It should be noted that the reality of the callback ID management server 800 is a database server capable of performing accessing at an ultra-high speed such as the KVS server 600.

The client 400 is a node including a KVS application 410, a KVS library 420, and a callback processing section 430 therein. Among them, as the KVS application 410 and the KVS library 420 are the same as the KVS application 111 and the KVS library 112 of the third exemplary embodiment, the description thereof is not provided herein.

Figure 9:
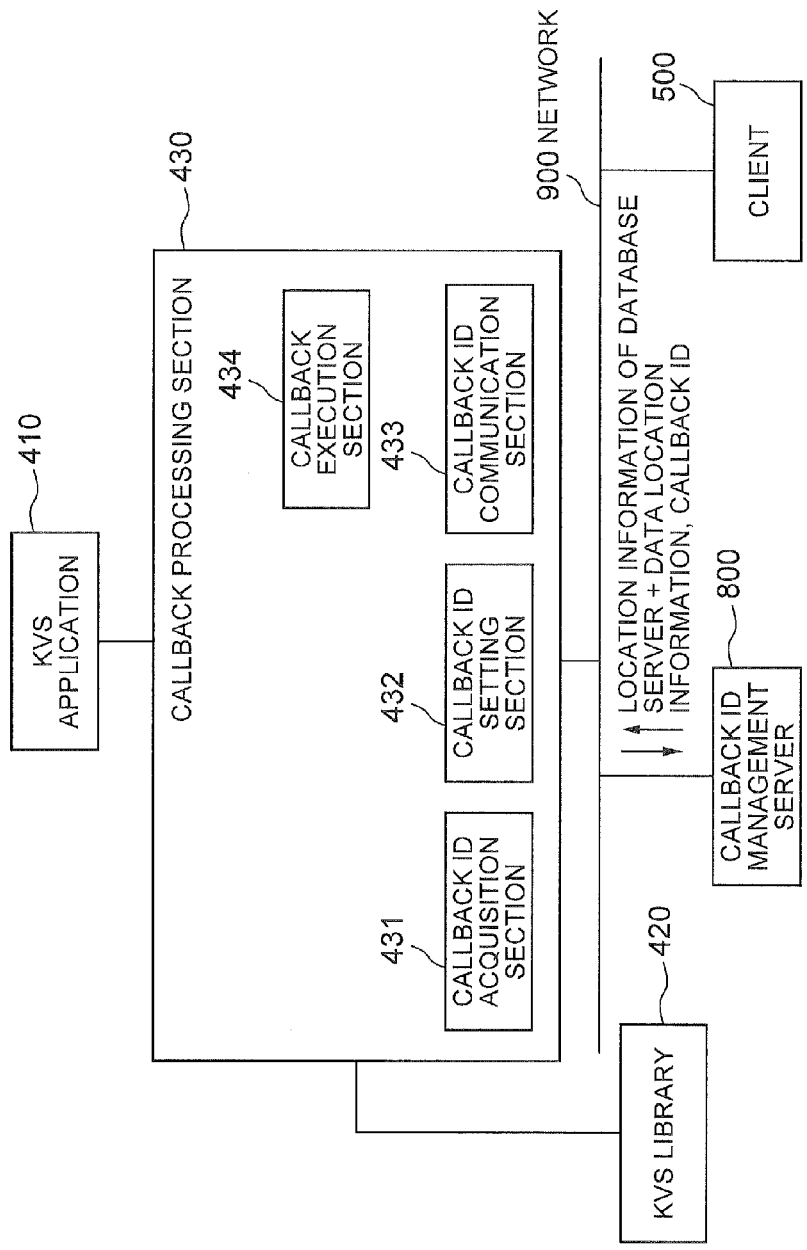
FIG. 9 is a block diagram showing a callback processing section of the fourth exemplary embodiment of the present invention.

FIG. 9 shows the details of the callback processing section 430 and relations with other components. Referring to FIG. 9, the callback processing section 430 includes a callback ID acquisition section 431, a callback ID setting section 432, a callback ID communication section 433, and a callback execution section 434.

The callback ID acquisition section 431 determines the access type included in an access request notified from the KVS application 410. If the access type is an "update-related" access which performs updating of data, the callback ID acquisition section 431 makes an inquiry to the callback ID management server 800 based on a character string generated by linking an identifier for uniquely identifying a database to be accessed, that is, an IP address of a database to be accessed for example (hereinafter description will be given on the assumption that an identifier for uniquely identifying a database to be accessed is an IP address of a database to be accessed) and data location information (key in the case of KVS) included in the access request, and acquires a callback ID associated with the data location information. It should be noted that the callback ID acquisition section 431 releases the association of the callback ID, and deletes it from the callback ID management server 800.

The callback ID communication section 433 transmits and receives a callback ID. Specifically, based on the callback ID acquired by the callback ID acquisition section 431, the callback ID communication section 433 notifies the callback processing section of the corresponding program, of the callback ID. This notice corresponds to a data update notice. Further, when receiving a callback ID from another program, the callback ID communication section 433 notifies the callback execution section 434 of it.

The callback execution section 434 executes a corresponding callback function based on the callback ID notified from the callback ID communication section 116. Thereby, data update is notified to the KVS application 111.

If a function pointer of a callback function is added to the access request, the callback ID setting section 432 generates a character string by linking the IP address of the self node, the PID of the self program, and the function pointer address of the callback function, as a callback ID, and stores this callback ID in the callback ID management server 800 in association with a character string generated by linking the IP address of the database server to be accessed and the key. It should be noted that if there is any callback ID having been registered, the callback ID setting section 432 adds the generated callback ID.

The SQL server 700 is a server which accepts an access request in SQL format from a client and processes it. It should be noted that the SQL server 700 does not have a function of executing processing designated by an application at the time of data update, like a stored procedure.

The client 500 is a node including an SQL application 510, an SQL library 520, and a callback processing section 530 therein.

The SQL application 510 is the subject which performs an access to the SQL server 700, and issues an access request to the SQL server 700. Here, an access request includes an access type such as "INSERT", "SELECT", or the like, data location information of an access destination, a data buffer, and callback information. Among them, data location information is information showing the location of data to be accessed, which corresponds to a table name of an SQL statement. Hereinafter, description will be given on the assumption that a table name is data location information. Data buffer shows data associated with location information, which corresponds to a value included in an SQL statement. Further, callback information is information of callback which is called back when data showing data location information in an access request is updated by another program. Callback information corresponds to a callback function, for example. Hereinafter, description will be given on the assumption that a function pointer address of a callback function is callback information. If it is not necessary to call back even when data is updated by another program, there is no need to designate callback information.

The SQL library 520 manages an interface between the SQL server 700 and the SQL application 510, and transmits an access request in a form compatible with the interface of the SQL server 700. Further, when a processing result is returned from the SQL server 700, the SQL library 520 returns it to the upper level section.

The callback processing section 530 has the same configuration as that of the callback processing section 430. However, an access type to be determined as an "update-related" access by the callback ID acquisition section, inside the callback processing section 530, is different. Here, an access type in which update is caused in the SQL server, such as "INSERT" or "UPDATE", is determined as an "update-related" access.

Next, the overall operation of the present embodiment will be described in detail. First, an operation when the client 400 accesses the KVS server 600 will be described with reference to the flowchart of FIG. 10.

Figure 10:
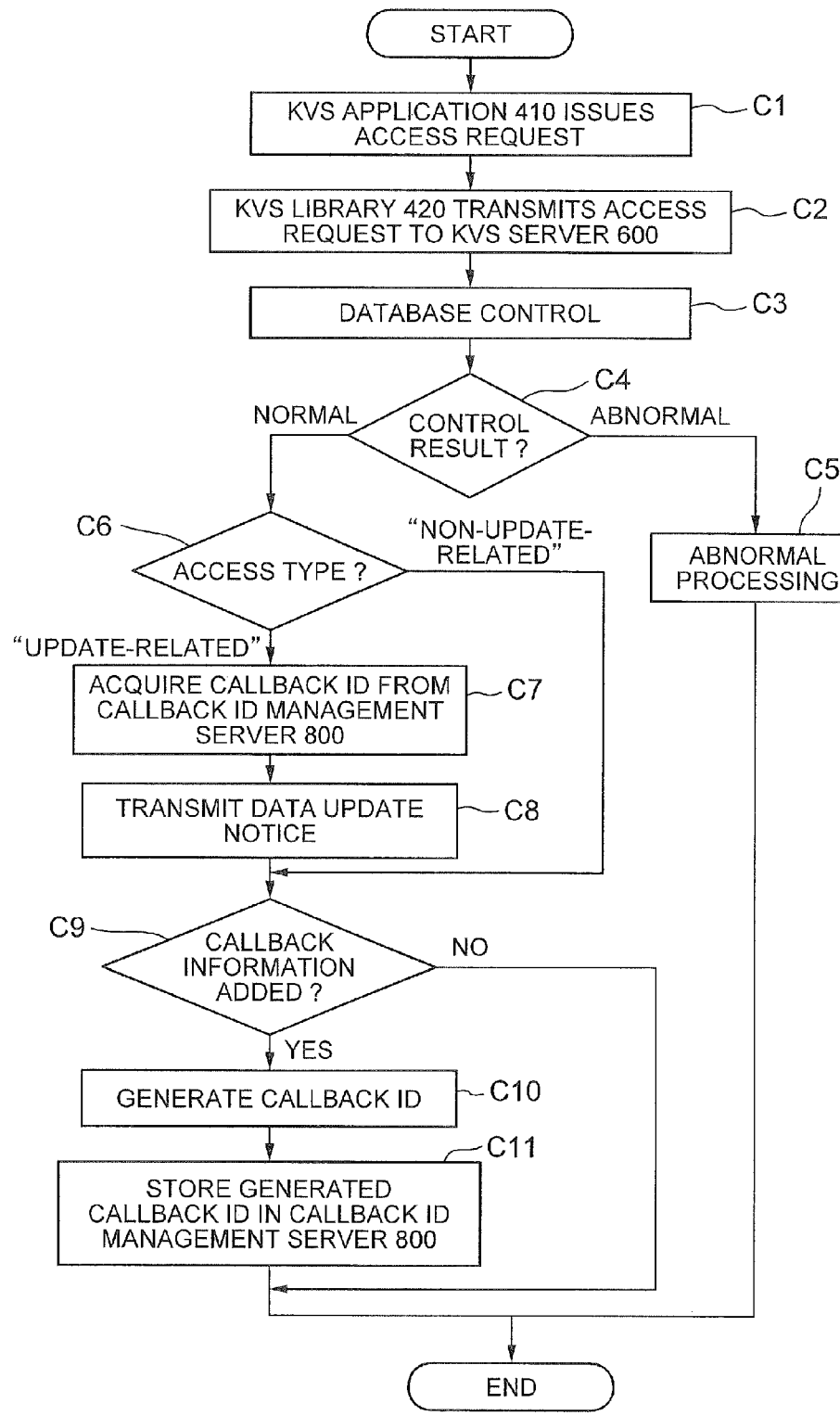
FIG. 10 is a flowchart showing an operation at the time of issuing an access request in the fourth exemplary embodiment of the present invention.

First, the KVS application 410 issues an access request to the KVS server (step C1 in FIG. 10). The KVS library 420 transmits the access request to the KVS server 600 (step C2). The KVS server 600 performs database control based on the transmitted access request, and returns a processing result to the KVS library 420 (step C3). The KVS library 420 determines the processing result from the KVS server 600 (step C4), and if the result is abnormal, performs abnormal processing and ends the processing (step C5). If the result is normal, the callback ID acquisition section 431 determines the access type of the access request (step C6). At step C6, if the access type is an "update-related" access, the callback ID acquisition section 431 makes an inquiry to the callback ID management server 800 to acquire a callback ID associated with the key of the access request, and notifies the callback ID communication section 433 of the acquired ID (step C7). Then, the callback ID communication section 433 transmits the callback ID as a data update notice to the program uniquely directed from the notified callback ID (step C8).

Next, the callback ID setting section 432 determines whether or not a pointer address of a callback function is added to the access request (step C9). At step C9, if a pointer address is added, the callback ID setting section 432 generates a character string by linking the IP address of the self node, the PID of the self program, and the pointer address of the callback function, stores it in the callback ID management server 800 in association with the key (step C11), and ends the processing. At step C9, if a pointer address is not added, the callback ID setting section 432 ends the processing, At step C6, if the access type is a "non-update-related" access, the callback ID setting section 432 proceeds to step C9.

An operation when the client 500 accesses the SQL server 700 is similar to the case of the operation when the client 400 accesses the KVS server 600, where the KVS application 410 is replaced with the SQL application 510, the KVS library 420 is replaced with the SQL library 520, the callback processing section 430 is replaced with the callback processing section 530, and the KVS server 600 is replaced with the SQL server 700.

Next, an operation when the client 400 receives a data update notice will be described with reference to the flowchart of FIG. 11.

Figure 11:
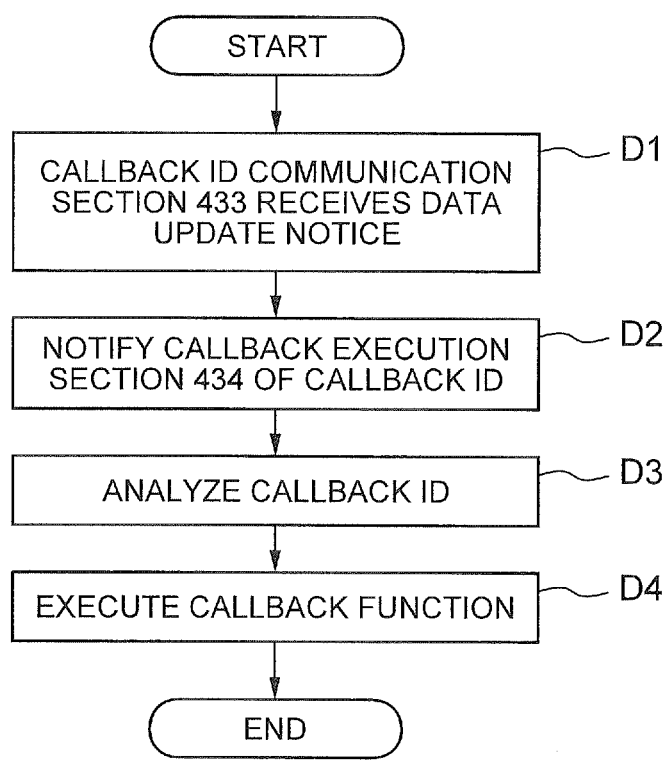
FIG. 11 is a flowchart showing an operation at the time of receiving data update notice in the fourth exemplary embodiment of the present invention.

The callback ID communication section 433 receives a data update notice from another client (step D1 in FIG. 11). Then, the callback ID communication section 433 notifies the callback execution section 434 of the callback ID included in the data update notice (step D2). The callback execution section 434 analyzes the callback ID, and executes a corresponding callback function (steps D3, D4).

As the operation when the client 500 receives a data update notice is the same as the operation when the client 400 receives a data update notice, the description thereof is not provided herein.

As the present embodiment is configured such that the callback ID acquisition section and the callback ID setting section provide an identifier for uniquely identifying a database to be accessed to data location information so as to allow the callback ID management server to be accessed, it is possible to give update notice of a plurality of database servers.

While the exemplary embodiments of the present invention have been described above, the present invention is not limited to the above-described embodiments, and various additions and changes can be made thereto. Further, in the present invention, the functions thereof can be realized by computers and programs, as well as by hardware. A program is provided by being stored in a computer readable storing medium such as a magnetic disk or a semiconductor memory, or a portable medium such as a flexible disk, an optical disk, a magneto-optical disk, a semiconductor memory, or the like. A program is read by a computer when the computer is started, for example, and by controlling the operation of the computer, causes the computer to function as the means such as an access requesting means, an access type determination means, a notified party information acquisition means, a notifying means, a notified party information load determination means, a notified party information registration means, and the like of each of the exemplary embodiments described above.

The present invention is based upon and claims the benefit of priority from Japanese patent application No. 2011-026735, filed on Feb. 10, 2011, the disclosure of which is incorporated herein in its entirety by reference.

DESCRIPTION OF REFERENCE NUMERALS

1 information processing device
2 database server
3 network
4 notified party information storage means
11 notified party information storage means
12 access requesting means
13 access type determination means
14 notified party information acquisition means
15 notifying means

What is claimed is:

1. A database update notification method to be performed by an information processing device including an access requesting unit that issues an access request to a database server, an access type determination unit, a notified party information acquisition unit, a notifying unit, a notified party information addition determination unit, and a notified party information registration unit, the information processing device connecting with a notified party information storage unit that stores information of a notified party to which notice is given when there is any change in the data in association with location information of data stored in the database server, the method comprising:
  by the database server, when the access requesting unit issues the access request, performing database control based on the access request to return a processing result of the database control to the access requesting unit;
  by the access type determination unit, determining whether or not the access request comprises an access request relating to updating;
  by the notified party information addition determination unit, determining whether or not the access request comprises information of a notified party to which notice is given when there is any change in the data accessed by the access request;
  if the access request comprises the access request relating to updating, by the notified party information acquisition unit, acquiring information of a notified party corresponding to location information of data to be updated by the access request, from the notified party information storage unit;
  by the notifying unit, giving notice to a notified party specified in the acquired information of the notified party; and
  by the notified party information registration unit, storing the information of the notified party added to the access request in the notified party information storage unit in association with location information of data to be accessed included in the access request.

2. The database update notification method, according to claim 1, wherein the information of the notified party includes an identifier specifying an application program running on the self information processing device.

3. The database update notification method, according to claim 1, wherein the information of the notified party includes an identifier specifying another information processing device and an identifier specifying an application program running on the another information processing device.

4. The database update notification method, according to claim 1, wherein the information of the notified party includes information specifying a callback function as information to be notified to the notified party.

5. The database update notification method, according to claim 1, wherein the notified party information storage unit is connected with a network so as to be shared by a plurality of information processing devices.

6. The database update notification method, according to claim 1, wherein the notified party information storage unit is connected with each of the information processing devices.

7. The database update notification method, according to claim 1, wherein, the notified party information acquisition unit acquires information of the notified party, and simultaneously deletes an association between the acquired information of the notified party and the location information of the data from the notified party information storage unit.

8. The database update notification method, according to claim 1, wherein the notified party information acquisition unit is configured to delete an association between the acquired information of the notified party and the location information of the data from the notified party information storage unit.

9. The database update notification method, according to claim 1, wherein the notified party information storage unit comprises a callback ID management section that stores a key and a callback ID in association with each other.

10. The database update notification method, according to claim 9, wherein the callback ID includes an identifier that identifies an application and callback information in a client.

11. The database update notification method, according to claim 10, wherein the notified party information acquisition unit comprises a callback ID acquisition section that determines an access type included in an access request notified from a Key Value Store (KVS) application.

12. The database update notification method, according to claim 11, wherein, if the access type includes an update-related access, the callback ID acquisition section acquires a callback ID associated with data location information from the callback ID management section.

13. The database update notification method, according to claim 1, wherein the notified party information registration unit stores the information of the notified party added to the access request in the notified party information storage unit so as to be associated with the location information of data to be accessed being included in the access request.

14. The database update notification method, according to claim 1, wherein the access request includes a request to access the database server, and
wherein the notified party information storage unit includes an unit different from the database server.

15. An information processing device connecting with a database server and a notified party information storage unit that stores information of a notified party to which notice is given when there is any change in the data in association with location information of data stored in the database server, the information processing device comprising:

an access requesting unit that issues an access request to the database server;
an access type determination unit that determines whether or not the issued access request comprises an access request relating to updating;
a notified party information addition determination unit that determines whether or not the access request comprises information of a notified party to which notice is given when there is any change in the data accessed by the access request;
a notified party information acquisition unit that, if the issued access request comprises the access request relating to updating, acquires information of a notified party corresponding to location information of data to be updated by the access request, from the notified party information storage unit;
a notifying unit that gives notice to a notified party specified in the acquired information of the notified party;
a notified party information addition determination unit that determines whether or not the access request comprises information of a notified party; and
a notified party information registration unit that stores the information of the notified party added to the access request in the notified party information storage unit in association with location information of data to be accessed included in the access request,
wherein, when the access requesting unit issues the access request, the database server performs database control based on the access request to return a processing result of the database control to the access requesting unit.

16. The information processing device according to claim 15, wherein the notified party information acquisition unit acquires information of the notified party, and simultaneously deletes an association between the acquired information of the notified party and the location information of the data from the notified party information storage unit.

17. The information processing device, according to claim 15, wherein the notified party information storage unit comprises a callback ID management section that stores a key and a callback ID in association with each other.

18. The information processing device, according to claim 17, wherein the callback ID includes an identifier that identifies an application and callback information in a client.

* * * * *